United States Patent [19]

Haidle et al.

[11] Patent Number: 4,932,749
[45] Date of Patent: Jun. 12, 1990

[54] OPTICAL WAVEGUIDES FORMED FROM MULTIPLE LAYERS

[75] Inventors: Rudy H. Haidle; Michel E. Marhic, both of Evanston, Ill.

[73] Assignee: L'Air Liquide, Societe Anonyme Pour l'Etude et l'Exploitation des Procedes George Claude, Paris, France

[21] Appl. No.: 324,703

[22] Filed: Mar. 17, 1989

[51] Int. Cl.⁵ .............................................. G02B 6/20
[52] U.S. Cl. .............................. 350/96.32; 350/96.10; 350/96.30; 350/96.34
[58] Field of Search ............... 350/96.10, 96.29, 96.30, 350/96.32, 96.34

[56] References Cited

U.S. PATENT DOCUMENTS

| | | | |
|---|---|---|---|
| 3,436,141 | 4/1969 | Comte | 350/96.32 X |
| 3,467,098 | 9/1969 | Ayres | 350/96.29 X |
| 3,583,786 | 6/1971 | Marcatilli | 350/96.32 X |
| 3,973,828 | 8/1976 | Onoda et al. | 350/96.32 X |
| 4,194,808 | 3/1980 | Marhic et al. | 350/96.32 |
| 4,652,083 | 3/1987 | Laakmann | 350/96.32 |
| 4,805,987 | 2/1989 | Låakmann et al. | 350/96.32 |
| 4,830,462 | 5/1989 | Karny et al. | 350/96.32 |

FOREIGN PATENT DOCUMENTS 59-123801  7/1984  Japan ...................... 350/96.29 X Primary Examiner—Frank Gonzalez
Assistant Examiner—Brian M. Healy
Attorney, Agent, or Firm—Oblon, Spivak, McClelland, Maier & Neustadt

[57] ABSTRACT

An optical waveguide for infrared light includes a series of metal layers. A thick outer layer of nickel is provided for mechanical stiffness to make the structure self-supporting. Thinner inside layers are also provided of metals such as silver, gold and copper which are good heat conductors. Since nickel has a low thermal conductivity, the waveguide can be damaged due to heat build-up. The layers of good conductors spread the heat efficiently to remove this possibility while the nickel continues to provide the necessary strength. A highly-reflective inert inside layer of gold may also be provided.

10 Claims, 1 Drawing Sheet

OPTICAL WAVEGUIDES FORMED FROM MULTIPLE LAYERS

BACKGROUND OF THE INVENTION

1. Field of the Invention

The present invention relates generally to optical waveguides and more particularly to whispering gallery waveguides for infrared light.

2. Discussion of the Background

Although fiber optics waveguide have been widely used for transmitting visible light, they are not completely successful at transmitting infrared radiation. In particular, fiber optic waveguides undergo large losses at the infrared frequencies. Since infrared waveguides are necessary in places where it is not desirable to use rotatable mirrors and articulated arms, other forms of waveguides have been developed.

One such infrared waveguide is shown in U.S. Pat. No. 4,194,808. In this type of waveguide, a highly polished metal surface, such as copper, is used to transmit surface waves of infrared radiation. Although this type of apparatus works very well, problems still arise in the easy fabrication of this device and in maintaining the quality of the transmission.

Although copper does act as a good transmitter of these waves, it does not provide sufficient rigidity for easy formation and maintenance of the waveguide. Accordingly, copper by itself is not a perfect solution.

Other materials such as nickel have been utilized to form the waveguide which have greater rigidity and allow the waveguide to be self-supporting. However, nickel has a relatively low thermal conductivity and as a result has other problems. Specifically, this type of guide cannot withstand very high laser power and heats up rather quickly to high temperatures even at moderate laser power.

SUMMARY OF THE INVENTION

Accordingly, one object of the present invention is to provide a novel waveguide structure which is easily and inexpensively formed.

Another object of this invention is to provide a novel waveguide structure which is not subject to heating up even at relatively high laser power.

A further object of this invention is to provide a novel waveguide structure which is easy and inexpensive to manufacture, is self-supporting and does not heat up appreciably.

Briefly these and other objects of the invention are achieved by providing a series of metal layers having different properties. The overall properties of the combination of layers provides rigidity, thermal conductivity and protection from chemical reaction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
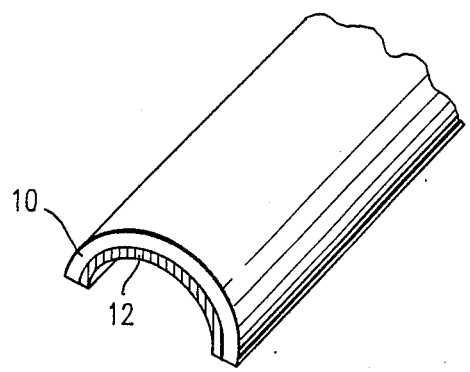
FIG. 1 shows a perspective view of a two-layer device according to the present invention.
Figure 2:
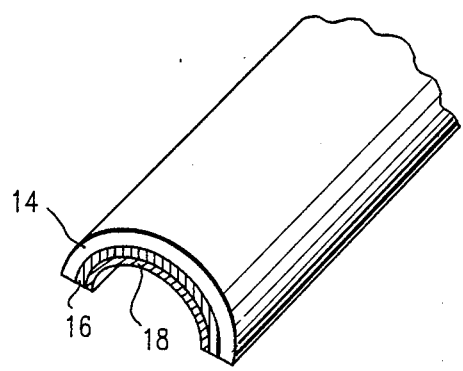
FIG. 2 shows a perspective view of a three-layer device according to the present invention.

Various other objects, features and attendant advantages of the present invention will be more fully appreciated as the same becomes better understood from the following detailed description when considered in connection with the accompanying drawings in which like reference characters designate like or corresponding parts throughout the several views and wherein FIGS. 1 and 2 show waveguides according to the present invention having multiple layers. In FIG. 1, a two-layer device is shown having an outer layer 10 which provides rigidity and an inner layer 12 which provides thermal conductivity. FIG. 2 shows a three-layer device with an outer layer 14 which provides rigidity, a central layer 16 which provides thermal conductivity and a thin inner layer 18 which provides high reflectivity, inertness, and prevents corrosion at the waveguide surface.

In order for the waveguide to have the various properties which are desirable, different materials are used in layers as needed. In order to make the waveguide self-supporting, an outer layer of relatively stiff material is utilized. Preferably, this material would be nickel, which is easily formed, commonly used and provides good mechanical properties. Other materials could also be used, for example magnesium, tantalum, titanium or chromium or some alloy of nickel or other metal which provides similar mechanical properties.

The next important characteristic is good thermal conductivity for removing heat and thus preventing damage to the structure. A number of different materials could be used for this and in particular silver, gold and copper may be used. Copper and silver are both possible for this use since both have good thermal conductivity and both are easily formed. Silver is somewhat more expensive than copper and accordingly copper is the preferable material used. Gold can also be used, however the cost of gold makes it prohibitive for purposes of thermal conductivity. Any other high-conductivity material could also be used.

In order to prevent the surface of the waveguide from corroding or otherwise chemically interacting, it is preferable to have a third layer 18 made from an inert material to provide the surface. It is possible to use a thin layer of gold for this purpose. Although the cost of gold prevents it from being used as a thermal conductor, the thin layer needed for inertness costs considerably less and would not be prohibitive. Any other inert material could also be used as long as it does not interfere with the thermal conductivity properties and allows the surface wave transmission with low losses.

In the preferred embodiment, the outer layer would be made of nickel and two layers for thermal conductivity would be provided. The larger thickness would be made of copper and a smaller thickness of silver would be placed on the inner side of the copper layer. The inside inert layer would be made of gold for protection and high reflectivity. The nickel layer would be 100 microns thick. The copper layer would have a similar thickness while the silver layer would be only 10 microns thick. The gold layer would be about ½ micron. The gold and silver layers would be deposited by vapor deposition while the copper and nickel layers could be electroplated.

The waveguide to be formed should have a concave inner surface, as shown in the figures. The waveguide is easily formed by depositing the various layers on some type of mandrel having a curved raised surface. The depositing may take place by any of the standard depositing techniques such as vapor deposition, sputtering, electroplating, etc. The particular method chosen and depends on the thickness desired of the various layers.

It should be remembered that a number of variations are possible using the basic concept of this device. The number and thicknesses of the various layers can be changed as well as the particular metals used. The basic idea is to use the properties of the different metal layers in combination to give the overall waveguide different thermal and mechanical properties.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. A waveguide comprising:
   a self-supporting outer layer made of a first material which is relatively stiff so as to support the waveguide;
   a heat conducting layer made of a second material which has good thermal conductivity; and
   an inert layer made of a third material for preventing chemical activity with the waveguide and for giving high reflectivity;
   said three layers being deposited successively on a mandrel to form the waveguide.
2. The waveguide according to claim 1, wherein the first material is nickel.
3. The waveguide according to claim 2, wherein the second material is copper.
4. The waveguide according to claim 2, wherein the second material is silver.
5. The waveguide according to claim 2, wherein the second material is gold.
6. The waveguide according to claim 1, wherein the third material is gold.
7. The waveguide according to claim 6, wherein said heat conducting layer is formed of two layers of different materials.
8. The waveguide according to claim 7, wherein one of the materials is silver and the other is copper.
9. The waveguide according to claim 1, wherein the deposition of one of the layers is done by electroplating.
10. The waveguide according to claim 1, wherein the deposition of one of the layers is done by vapor deposition.

* * * * *